United States Patent [19]
Campbell

[11] Patent Number: 5,657,800
[45] Date of Patent: Aug. 19, 1997

[54] GAS TANK EVACUATOR

[76] Inventor: Michael C. Campbell, 1400 N. Woodhouse Rd., Virginia Beach, Va. 23454

[21] Appl. No.: 547,863

[22] Filed: Oct. 25, 1995

[51] Int. Cl.⁶ ........................................... B65B 31/04
[52] U.S. Cl. .................. 141/98; 141/65; 141/94; 141/286; 29/213.1; 29/221.6; 29/801
[58] Field of Search ..................... 141/65, 94, 95, 141/98, 286, 367, 368, 384, 385; 29/213.1, 221.6, 801

[56] References Cited

U.S. PATENT DOCUMENTS

| | | | |
|---|---|---|---|
| 2,851,768 | 9/1958 | Ellis | 29/213.1 |
| 3,840,967 | 10/1974 | Olson | 29/213.1 |
| 5,188,155 | 2/1993 | Kremer | 141/65 |
| 5,421,380 | 6/1995 | Campbell | 141/65 |
| 5,469,898 | 11/1995 | Campbell | 141/65 |

*Primary Examiner*—Henry J. Recla
*Assistant Examiner*—Steven O. Douglas
*Attorney, Agent, or Firm*—Griffin, Butler, Whisenhunt & Kurtossy

[57] ABSTRACT

A gas tank evacuator (10) comprises: an evacuator housing (12) to be attached to a neck (44) of a gas tank (38); and an elongated valve-removal rod (14) movably mounted on, and passing through the evacuator housing, the valve-removal rod having a valve-engaging element (56) at a lower end thereof and a manipulation knob (54) member at a top end thereof for being manipulated to cause the valve-removal rod to engage and remove the overflow valve assembly. The evacuator housing has female threads (26) to be screwed onto male threads of the gas tank attachment neck with a stop (50, 56, 72) positioning the valve-removal rod aligned with the overflow valve assembly. When the evacuator housing is screwed to the gas tank attachment neck a fixed main valve actuator (46) on the evacuator housing opens a main valve (48) of the gas tank and residue gas in the tank is released to a sealed evacuation cavity (18). A pressure gauge (16) for providing an indication of the pressure of the released gas and a filter (40) for allowing release of the released gas to atmosphere communicate with the evacuation cavity.

20 Claims, 3 Drawing Sheets

GAS TANK EVACUATOR

BACKGROUND OF THE INVENTION

This invention relates generally to the art of gas cylinders, or tanks, and more specifically to methods and devices for disposing of, or recycling, gas cylinders.

Disposal of hazardous waste is currently regulated in the U.S. by the Resource Conservation And Recovery Act (RCRA) of 1976. Many other developed countries have similar legislation. These laws attempt to control hazardous waste from "Cradle to Grave." One of the items classified as "hazardous-waste" under the RCRA is "contained gas." Thus, gas tanks, or cylinders, which have been used to store, propane, mapp, or oxygen gases, for example, are classified as hazardous waste and they retain this classification until it can be clearly shown that they no longer contain hazardous waste. For this reason, waste handlers charge large fees for disposing of substantially exhausted small propane tanks, for example. In this regard, many companies which regularly use propane gas pay as much as $35.00 per exhausted tank simply to dispose of them. It should be noted that although old gas tanks cannot normally be reused, the material from which they are made, often steel, can be recycled. Notwithstanding this, because they still may contain hazardous waste, waste handlers charge large fees for their disposal.

If users of propane tanks, and waste handlers, could readily, and visually, ascertain that exhausted tanks no longer contain gas, and that it is not possible that they could hold gas, the tanks could be easily and economically disposed of and recycled as scrap steel.

Thus, it is an object of this invention to provide a gas tank evacuator for not only safely evaluating contents of gas tanks, that is for draining residue gases from them, but also for preparing the gas tanks so that it can be clearly and visibly ascertained that they cannot possibly contain hazardous gases.

It is also an object of this invention to provide such a gas tank evacuator which can be employed by users of gas tanks, such as companies which employ large numbers of propane tanks, rather than only by waste handlers.

It is also an object of this invention to provide a gas tank evacuator which is highly portable, but which can be used either as a table-mounted unit or as a hand-held unit.

Yet another object of this invention is to provide a gas tank evacuator which takes very little strength or dexterity to operate and which is uncomplicated and relatively inexpensive in structure.

It is a further object of this invention to provide a method of preparing gas tanks for their disposal which is inexpensive but yet effectively communicates to others a disarmed nature of such thusly prepared gas tanks.

It has been proposed by Michael C. Campbell, in U.S. Pat. No. 5,421,380, issued Jun. 6, 1995 to provide a gas tank evacuator having an evacuator housing into which an attachment neck of a gas tank can be screwed and an elongated valve-removal rod for passing through the evacuator housing to engage a valve of the gas tank at a valve-engaging lower end thereof. The valve-removal rod can be moved longitudinally in the evacuator housing by means of a valve-removal-rod lever which is pivotally attached to the housing and to the valve-removal rod by parallel pivot links. However, a connection between the valve-removal-rod lever and the valve-removal rod also allows the valve-removal rod to rotate in the housing. The gas tank evacuator also includes an elongated valve actuator pin passing through and being slidable in the valve-removal rod for independently actuating the valve of the gas tank.

Thus, the attachment neck of a gas tank can be screwed to the housing with the valve-removal rod pulled longitudinally away from a valve in the attachment neck. The valve-actuator pin can then be moved longitudinally through the valve-removal rod for depressing a stem of the valve of the gas tank to release gas from the gas tank and check gas pressure in the gas tank. Thereafter, the valve-removal-rod lever can be pivoted to drive a valve engaging device at the lower end of the valve-removal rod into engagement with the stem-actuated valve. The valve-removal rod can then be rotated to unscrew the valve from the gas tank, and the valve-removal-rod lever can be pivoted upwardly for removing the valve.

The gas tank evacuator channels gases evacuated from gas tanks through a filter canister which is removably attached to the evacuator housing.

Although this prior art device described by Michael C. Campbell has tremendous benefits over the prior art, it has proven to have some drawbacks. One drawback is that it is rather difficult, and somewhat expensive, to construct the valve-removal rods and the elongated valve actuator pin. In this regard, a bore must be made in the valve-removal rod for rather snugly accommodating the actuator pin and the actuator pin must be specially made. The construction steps for making these elements requires a great deal of machining, which increases expenses. Also, the connection between the valve-removal rod lever and the valve-removal rod is somewhat complicated and expensive to fabricate.

Yet another difficulty with the prior art system of Michael C. Campbell is that after it has been used to unscrew the valve from the gas tank, it is not as easy to see that the gas tank has been disarmed as one would like. That is, one must look down a rather deep hole in the neck of the gas tank in order to verify that the main valve thereof has been removed.

In view of these two shortcomings of the prior art Campbell system, it is an object of this invention to provide a gas tank evacuator which is easier and less expensive to manufacture than is the prior Campbell gas-tank evacuator system, and which, once it has been used to remove a valve from a gas tank, makes it easier to ascertain that the gas tank has been disarmed (that is, that a valve thereof has been removed).

SUMMARY OF THE INVENTION

According to principles of this invention, a gas tank evacuator comprises: an evacuator housing to be attached to an attachment neck of a gas tank; and an elongated valve-removal rod movably mounted on, and passing through, the evacuator housing, the valve-removal rod having a valve-engaging element at a lower end thereof and a manipulation member at a top end thereof for being manipulated to cause the valve-engaging element to engage and remove an overflow valve assembly of the gas tank. The evacuator housing has female threads to be screwed onto male threads of the gas tank attachment neck, with a housing stop positioning the valve-removal rod in line with the overflow valve assembly. A main valve actuator of the evacuator housing opens a main valve of the gas tank when the evacuator housing is screwed to the gas tank attachment neck and any gas in the tank is released to a sealed evacuation cavity, and from there, through a filter, to outside atmosphere. A pressure gauge provides an indication of the pressure of the released gas.

BRIEF DESCRIPTION OF THE DRAWING

The invention is described and explained in more detail below using the embodiments shown in the drawings. The described and drawn features, in other embodiments of the invention, can be used individually or in preferred combinations. The foregoing and other objects, features and advantages of the invention will be apparent from the following more particular description of a preferred embodiment of the invention, as illustrated in the accompanying drawings in which reference characters refer to the same parts throughout the different views. The drawings are not necessarily to scale, emphasis instead being placed upon illustrating principles of the invention in a clear manner.

DESCRIPTION OF THE PREFERRED EMBODIMENT

A gas tank evacuator 10 comprises mainly an evacuator housing 12, a cylindrical valve-removal rod 14, and a pressure gauge 16.

Figure 1:
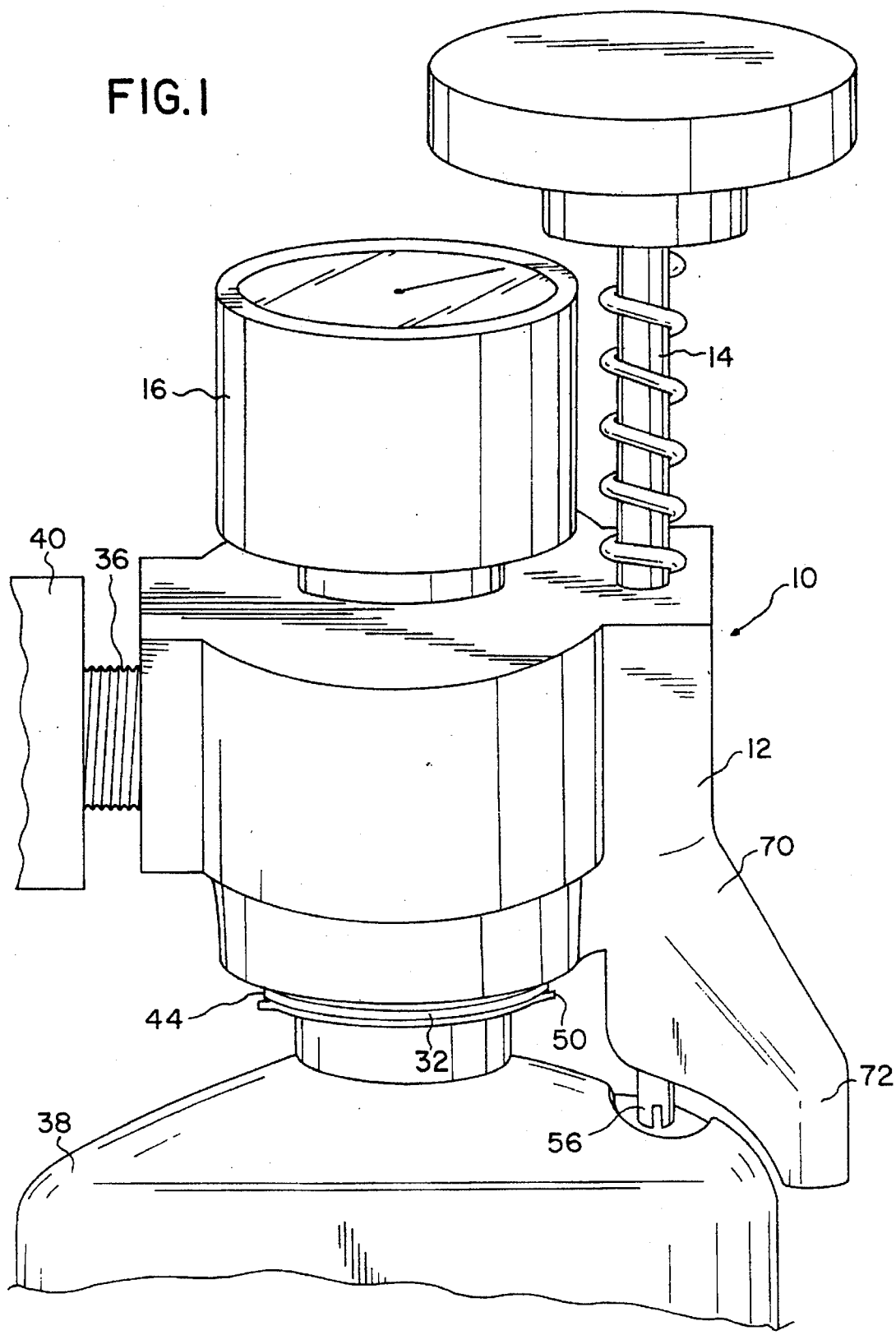
FIG. 1 is an isometric view of a gas tank evacuator of this invention along with a segment of a gas tank and a segment of a filter.
Figure 2:
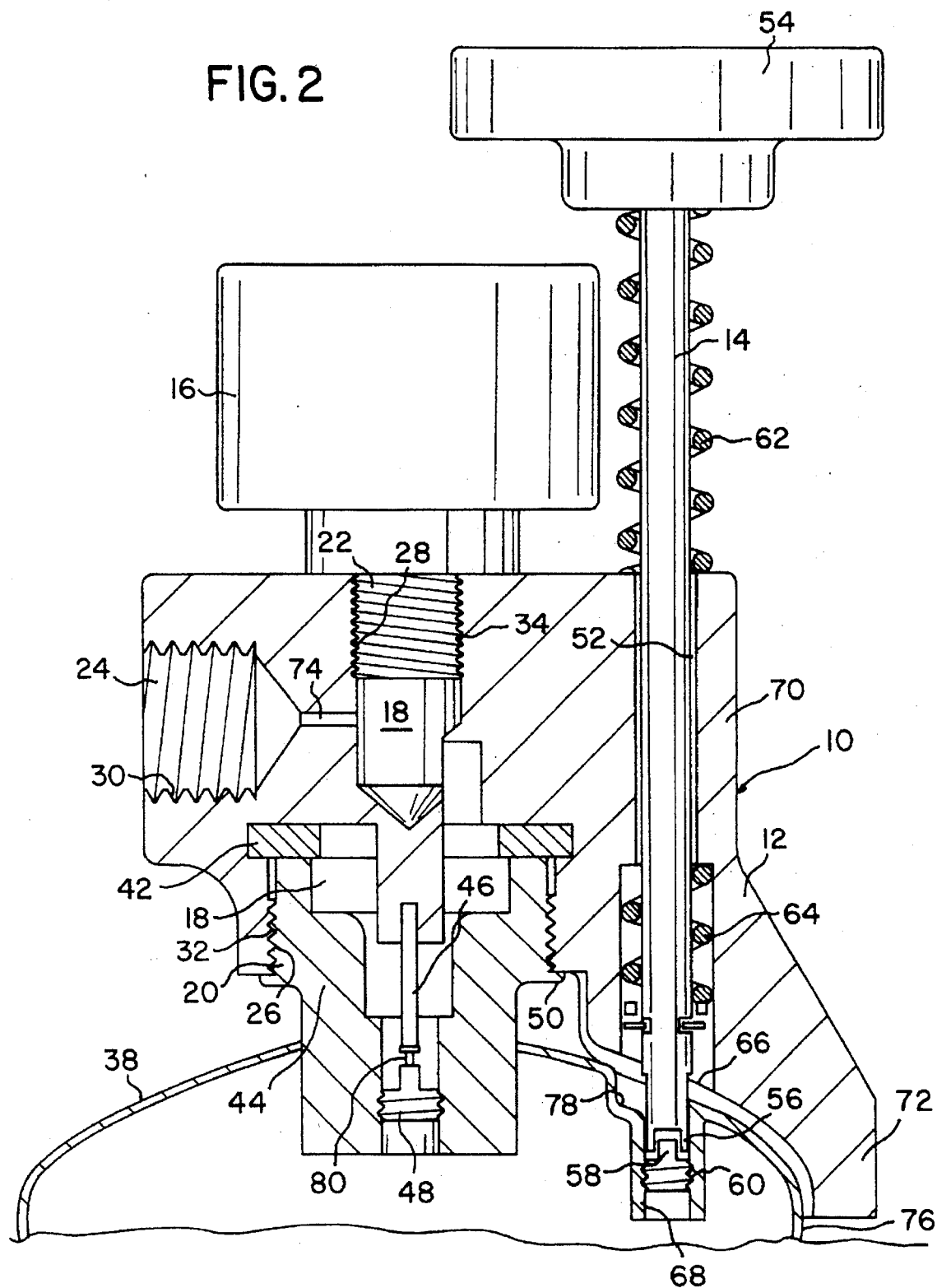
FIG. 2 is a side partially cross-sectional view of the gas tank evacuator of FIG. 1 along with the segment of the gas tank, however, the segment of the filter has been removed.
Figure 3:
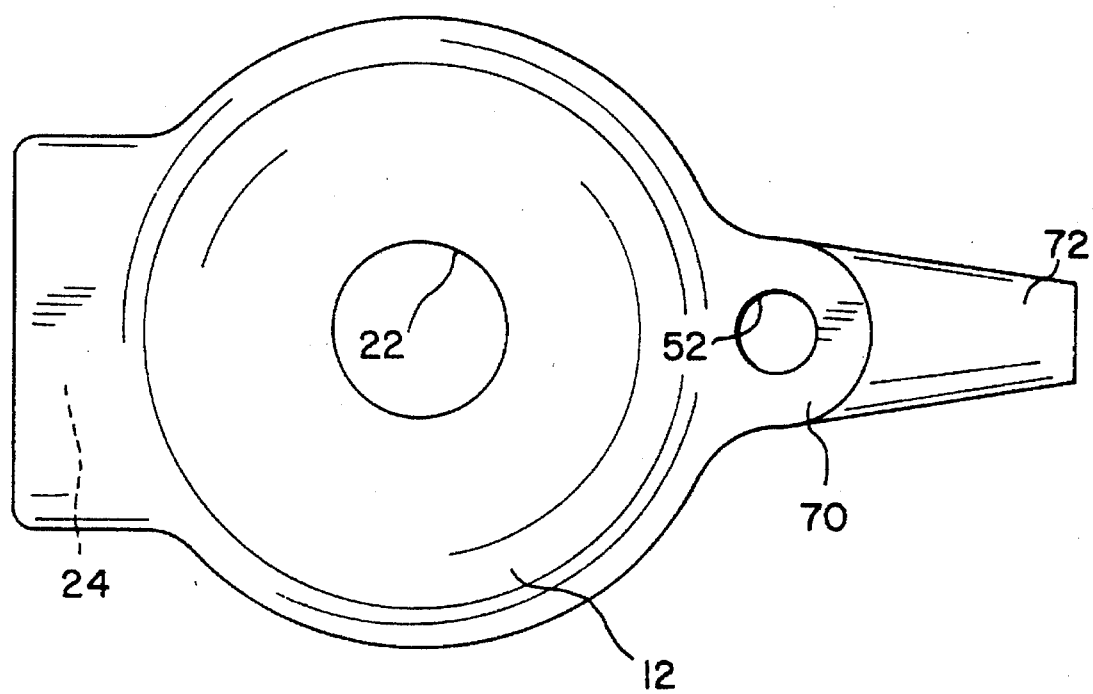
FIG. 3 is a top view of a housing of the gas tank evacuator of FIGS. 1 and 2.

The evacuator housing 12 defines an evacuation cavity 18 which opens to a bottom gas-tank mouth 20, a top pressure-gauge mouth 22, and a side filter mouth 24. As can be seen in FIG. 2, there are female threads 26, 28, 30 at each of the gas-tank mouth 20, pressure-gauge mouth 22, and filter mouth 24 for respectively receiving male threads 32, 34, 36 of a gas tank 38, the pressure gauge 16, and an activated-carbon filter 40. Thus, when the gas tank 38, the pressure gauge 16 and the filter 40, are screwed to the housing 12 by their respective threads, all of these elements communicate with one another via the evacuation cavity 18.

Located in the evacuation cavity 18 is a ring seal 42 for forming a seal between an upper edge of an attachment neck 44 of the gas tank 38 and the evacuator housing 12. A fixed main-valve actuator 46 is also mounted in the evacuation cavity 18 for actuating a main valve 48 of the gas tank 38. The main-valve actuator 46 is a rod which is fixedly attached to the evacuator housing 12 so as to extend downwardly from the evacuation cavity 18 through the gas-tank mouth 20, to engage a stem 80 of the main valve 48 of the gas tank 38 when the attachment neck 44 of the gas tank 38 is screwed into the female threads 26 of the gas-tank mouth 20. At the same time, the ring seal 42 ensures that any gas escaping from the gas tank 38 through the main valve 48 is transmitted to the filter mouth 24 and to the pressure-gauge mouth 22. As can be seen in FIG. 2, when the gas-tank mouth 20 is fully screwed onto the female threads 26, so that the housing 10 contacts a stop 50 at the end of the female threads 26, the ring seal 42 is squeezed between the outer end of the attachment neck 44 and the housing 10.

The valve-removal rod 14 is held in a bore 52 in the evacuator housing 12. A manipulation knob 54 is attached to a top end of the valve-removal rod 14 and a valve-engagement element 56 is at a lower end of the valve-removal rod 14. In this regard, the valve-engagement element 56, in the depicted embodiment, is a slot formed at the lower end of the valve-removal rod 14 for engaging a vertical, flat, portion 58 of an off-center overflow valve 60 (a check valve for allowing escape of excessive pressure) of the gas tank 38.

The valve-removal rod 14 is shown in FIG. 2 being pressed slightly downwardly by an operator (not shown) who is acting on the manipulation knob 54. In this regard, the valve-removal rod 14 is held in the bore 52 by a compressed upper biasing spring 62 and a compressed lower biasing spring 64, which act against one another to normally maintain the valve-engagement element 56 extending only slightly from a bottom mouth 66 of the bore 52. Thus, as shown in FIG. 2, the valve-engagement element 56 extends downwardly further from the bottom mouth 66 than it normally does when it is held by the upper and lower biasing springs 66 and 64. By manipulating the manipulation knob 54 an operator can urge the valve-removal rod 14 downwardly, as shown in FIG. 2, and rotate it to thereby unscrew the overflow valve 60 which, as can be seen in FIG. 2, is screwed into an overflow pipe 68 of a sidewall of the gas tank 38.

As can be seen in the drawings, the valve-removal rod 14 is mounted in a wing 70 of the evacuator housing 12. The wing 70 has a skirt 72 which extends downwardly in a contoured configuration about the sidewall of a body of the gas tank 38. The skirt 72 serves to properly support and position the valve-removal rod 14 as is further described below. A passage 74 leading from a main portion of the evacuation cavity 18 to the filter mouth 24 is calibrated so that readings taken from the pressure gauge 16 of pressure in the evacuation cavity 18 provide an accurate indication of an amount of gas remaining in the gas tank 38.

The housing 10 and the valve-removal rod 14 are constructed of non-corrosive metal.

Looking now at operation of the gas tank evacuator 10 of this invention, first a user screws a filter 40 to the filter mouth 24. In one embodiment a filter holder is screwed to the filter mouth 24 and a filter canister in the filter holder is changed as is required. However, it is not thought necessary to describe this structure in detail for this invention.

Then, when the operator desires to dispose of a gas tank 38, he screws male threads 32 of the attachment neck 44 of the gas tank into the female threads 26 of the gas-tank mouth 20 of the gas tank evacuator 10 until he cannot screw it any further because of the stop 50 contacting the housing 12 and/or the skirt 72 contacting a main tank housing 76 and/or the valve-engagement element 56 snapping into an overflow-valve depression 78 in the main tank housing 76. In this respect, male threads 32 of attachment necks 44 are standardized for all gas tanks such that almost all gas tanks have the same number of threads, with each thread having a pitch of 1/64 inch. Thus, the sizes of the female threads 26 of the gas-tank mouth 20 are calibrated such that once the housing 12 is fully screwed onto the female threads 26, and thereby contacts the stop 50, the valve-removal rod 14 will be positioned over the overflow valve 60. A backup stop is also formed by the skirt 72 which is calibrated to contact the main tank housing 76 when the valve-removal rod 14 is positioned above the overflow valve 60. Finally, a significant further backup is provided by the valve engagement element 56 of the valve-removal rod 14. That is when the housing is screwed onto the last thread of the female threads 26 of the attachment neck 44 the valve-engagement element 56 of the valve-removal rod 14 snaps into the overflow-valve depression 8. Therefore, an operator has little difficulty positioning the valve-removal rod 14 on the gas tank 38 when he mounts the gas tank evacuator 10 thereon, even though he cannot actually see the overflow-valve depression when the valve-removal rod 14 is positioned above it.

Similarly, as the gas tank evacuator 10 is screwed onto the gas tank 38 as described above, the fixed main-valve actuator 46 depresses the stem 80 of the main valve 48 to open the main valve 48. Once the main valve 48 is opened (preferably after the ring seal 42 has formed a seal), gas is released from the main tank housing 76 of the gas tank 38 into the evacuation cavity 18 and this gas communicates with the pressure gauge 16. Thus, the operator can read from the pressure gauge 16 pressure of gas in the gas tank 38 and thereby obtain an indication of the quantity of gas remaining in the gas tank 38. If the operator determines in this manner that the gas tank 38 contains so much gas that it should not yet been disposed, he unscrews the gas tank evacuator 10 from the gas tank 38 and takes no further action. However, should he determine that there is so little gas remaining in the gas tank 38 that it is time to dispose it, he leaves the gas tank evacuator 10 on the gas tank 38 until all remaining residue gas bleeds through the calibrated passage 74 and the filter 40 to atmosphere.

Once all of the gas has finished bleeding through the passage 74, which the operator can determine from reading the pressure gauge 16, the operator presses downwardly on the valve-removal rod 14 via the manipulation knob 54. Also via the manipulation knob 54, the operator simultaneously rotates the valve-removal rod 14. When the operator does this, the valve-engagement element 56 engages the flat portion 58 of the overflow valve 60. By rotating the valve-removal rod 14 the operator can unscrew the overflow valve 60 from the overflow pipe 68. Once the operator has fully unscrewed the overflow valve 60 in this manner, he unscrews the gas tank evacuator 10 from the gas tank 38 and allows the overflow valve 60 to fall out.

The operator then places a tag in the hole left through the overflow pipe 68, thereby indicating that there is no valve in the overflow pipe. An observer can also easily confirm this since the overflow valve is normally located relatively close to an outer surface of the main tank housing 76.

It will be understood by those of ordinary skill in the art that the gas tank evacuator of this invention does not require as much machining as do some earlier gas tank evacuators, thus, the gas tank evacuator of this invention can be constructed relatively inexpensively.

A further benefit of the gas tank evacuator of this invention is that, once it has been used to disarm a gas tank, it is relatively easy to observe that the gas tank has been disarmed because the overflow valve is easier to observe than is the main valve.

While the invention has been particularly shown and described with reference to a preferred embodiment, it will be understood by those of ordinary skill in the art that various changes in form and detail may be made therein without departing from the spirit and scope of the invention.

For example, it would be possible to place a valve in the passage 74 so that a measurement can first be taken with the pressure gauge 16 and then the passage 74 can be more fully opened.

Similarly, it would be possible to make the main-valve actuator 46 selectively operable, rather than being a fixed member which automatically operates the main valve 48 when the gas tank evacuator 10 is screwed to a gas tank 38.

It would also be possible to make the valve-removal rod 14 structurally different than it is shown in the drawings. Similarly, the evacuator housing 12 of the gas tank evacuator of this invention could be configured quite differently than shown in the drawings. For example, it could be made as a bench-mounted unit.

It is beneficial to have a skirt 72 which conforms to an outer configuration of the main gas tank housing 74 of the gas tank 38 to serve as a stop and to otherwise properly position the evacuator housing 12 on the has tank 38. By making the skirt 72 as a narrow wing an operator can observe the overflow valve 60 on each rotation of the gas tank 38 relative to the evacuator housing 12 when these two members are screwed together.

Also, the evacuator housing 12 could be constructed of a number of parts.

It is beneficial to properly calibrate the female threads 26 at the gas-tank mouth 20 of the evacuator housing 12 for also properly positioning the valve-removal rod 14 relative to the overflow-valve depression 78.

The invention claimed is:

1. A gas tank evacuator for evacuating a gas tank of a type having a main valve assembly at an attachment neck thereof and an overflow valve assembly adjacent said main valve assembly, said gas tank evacuator comprising:

an evacuator housing including an attachment means for attaching said housing to the attachment neck of the gas tank;

an elongated valve-removal rod for passing through said evacuator housing and being slidably mounted in said evacuator housing with freedom of movement therein, said valve-removal rod having a valve-engaging means at a first end portion thereof for engaging and removing the overflow valve assembly of the gas tank and a manipulation member at an opposite end portion thereof for being manipulated to cause said valve-removal rod to engage and remove the overflow valve assembly;

wherein said attachment neck of said gas tank can be attached to said housing by said attachment means and said manipulation knob can then be manipulated to cause said valve-removal rod to remove the overflow valve assembly.

2. A gas tank evacuator as in claim 1 wherein said evacuator housing defines an evacuation cavity for receiving gas released from said gas tank.

3. A gas tank evacuator as in claim 2 wherein is further included a main-valve actuator for actuating and thereby opening the main valve of said gas tank in response to said evacuator housing being attached by said attachment means to said gas tank.

4. A gas tank evacuator as in claim 3 wherein said evacuator housing includes a pressure gauge thereon for measuring a pressure of gas in said gas tank whose main valve has been opened by said main-valve actuator.

5. A gas tank evacuator as in claim 4 wherein is further included a filter means attached to said evacuator housing, said evacuation cavity channeling gas released from said gas tank through a filter to outside atmosphere.

6. A gas tank evacuator as in claim 2 wherein is further included a filter means attached to said evacuator housing, said evacuation cavity channeling gas released from said gas tank through a filter to outside atmosphere.

7. A gas tank evacuator as in claim 1 wherein said evacuator housing includes a positioning means for engaging said gas tank and thereby positioning said valve-removal rod at said overflow valve assembly when said housing attachment means is attached to said attachment neck of said gas tank.

8. A gas tank evacuator as in claim 7 wherein said attachment neck has male threads and said attachment means of said evacuator housing is female threads for engaging said male threads, and wherein said positioning means is a stop for preventing further rotation between said male and female threads.

9. A gas tank evacuator as in claim 8 wherein said evacuator housing defines an evacuation cavity for receiving gas released from said gas tank.

10. A gas tank evacuator as in claim 9 wherein is further included a main-valve actuator for actuating and thereby opening the main valve of said gas tank in response to said evacuator housing being attached by said attachment means to said gas tank.

11. A gas tank evacuator as in claim 10 wherein said evacuator housing includes a pressure gauge thereon for measuring a pressure of gas in said gas tank whose main valve has been opened by said main-valve actuator.

12. A gas tank evacuator as in claim 11 wherein is further included a filter means attached to said evacuator housing, said evacuation cavity channeling gas released from said gas tank through a filter to outside atmosphere.

13. A gas tank evacuator as in claim 1 wherein said valve-removal rod has freedom of longitudinal and rotational movement relative to said evacuator housing.

14. A gas tank evacuator as in claim 13 wherein said valve-removal rod is held in position by two oppositely acting springs.

15. A gas tank evacuator as in claim 14 wherein said valve-removal rod can be longitudinally pushed and rotated.

16. A method for preparing a gas tank for disposal comprising the steps of:

providing an evacuator housing including an attachment means for attaching said evacuator housing to an attachment neck of a gas tank, said evacuator housing further including a main-valve actuator for opening a main valve of the gas tank located within the attachment neck;

slideably mounting a valve-removal rod, having a manipulation member at one end and a valve-engagement element at the opposite end on the evacuator housing, laterally adjacent said main-valve actuator, said valve-removal rod sliding to bring said valve-engagement element into contact with an overflow valve of said gas tank located outside of said neck of said gas tank;

attaching the neck of the gas tank to the evacuator housing;

positioning the evacuator housing so that the valve-removal rod is aligned with said overflow valve of the gas tank;

urging the valve-engaging element of the valve-removal rod against the overflow valve of the gas tank by manipulating the manipulation member of the valve-removal rod to thereby engage the overflow valve and unscrew it from the gas tank.

17. A method as in claim 16 wherein the step of attaching the neck of the gas tank to the evacuator housing is accomplished by screwing the evacuator housing onto the neck of the gas tank and wherein the step of positioning the evacuator housing so that the valve-removal rod is aligned with the overflow valve is accomplished by providing a relative stop between the evacuator housing and the gas tank such that the gas tank and evacuator housing cannot easily be further screwed together when said track is properly aligned with said overflow valve.

18. A method as in claim 17 wherein is further included the steps of providing on the evacuator housing a pressure gauge; and wherein is further included the step of opening the main valve with the main-valve actuator when the gas tank evacuator is attached to the evacuator housing and checking the pressure of the gas in the gas tank with the pressure gauge to determine the amount of gas in the gas tank before operating the valve-removal rod to remove the overflow valve.

19. A method as in claim 18 wherein is further included the step of evacuating any residue of gas in the gas tank through a filter to atmosphere before operating the valve-removal rod to remove the overflow valve.

20. A method as in claim 17 wherein is further included the step of evacuating any residue of gas in the gas tank through a filter to atmosphere before operating the valve-removal rod to remove the overflow valve.

* * * * *